US 8,676,799 B1

(12) United States Patent
Vaver

(10) Patent No.: US 8,676,799 B1
(45) Date of Patent: Mar. 18, 2014

(54) EVALUATING TECHNIQUES FOR CLUSTERING GEOGRAPHIC ENTITIES

(75) Inventor: Jon Vaver, Lafayette, CO (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 12/868,631

(22) Filed: Aug. 25, 2010

Related U.S. Application Data

(63) Continuation of application No. 12/761,315, filed on Apr. 15, 2010.

(51) Int. Cl.
*G06F 17/30* (2006.01)

(52) U.S. Cl.
USPC .......................................... 707/736; 707/737

(58) Field of Classification Search
USPC .......................................... 707/737, 758, 736
See application file for complete search history.

(56) References Cited

U.S. PATENT DOCUMENTS

| | | | |
|---|---|---|---|
| 2007/0143345 A1 | 6/2007 | Jones et al. | |
| 2008/0016055 A1* | 1/2008 | Riise et al. | 707/5 |
| 2008/0188237 A1 | 8/2008 | Alles et al. | |
| 2008/0255768 A1* | 10/2008 | Martin et al. | 702/20 |
| 2009/0118593 A1 | 5/2009 | Jung et al. | |
| 2009/0254971 A1 | 10/2009 | Herz et al. | |
| 2010/0128988 A1* | 5/2010 | Kincaid | 382/199 |
| 2011/0087547 A1* | 4/2011 | Amaro et al. | 705/14.53 |
| 2011/0099169 A1 | 4/2011 | Lanxner et al. | |

OTHER PUBLICATIONS

Cho, Catherine, et al., "A Tandem Clustering Process for Multimodal Datasets," European Journal of Operational Research 168 (2006), pp. 998-1008.

* cited by examiner

*Primary Examiner* — Apu Mofiz
*Assistant Examiner* — Fariborz Khoshnoodi
(74) *Attorney, Agent, or Firm* — McDermott Will & Emery LLP

(57) ABSTRACT

Methods, systems, and apparatus, including computer programs encoded on computer storage media, for evaluating clusters of geographic entities, for example, to be used in a randomized geographic experiment. One method includes using a clustering algorithm to cluster geographic entities into a set of clusters, and identifying whether each geographic entity is an ambiguously classified entity or a definitively classified entity. The method further includes determining a measurement for the set of clusters according to a quantification of an attribute of the definitively classified entities and the ambiguously classified entities. Similar measurements can be calculated for other sets of clusters, and the clusters can be compared according to their measurements.

14 Claims, 10 Drawing Sheets

EVALUATING TECHNIQUES FOR CLUSTERING GEOGRAPHIC ENTITIES

CROSS-REFERENCE TO RELATED APPLICATIONS

This application is a continuation application of and claims priority to U.S. application Ser. No. 12/761,315, titled "Evaluating Techniques For Clustering Geographic Entities," filed on Apr. 15, 2010, which is incorporated herein by reference.

BACKGROUND

This specification relates to clustering of geographic entities.

Advertisers are often interested in the effects that viewing their advertisements have on subject behavior. For example, does viewing an advertisement make a subject more likely to purchase the advertiser's goods online or from a physical ("bricks and mortar") retail store? One way of measuring the effect of viewing an advertisement is through a controlled experiment, in which a random proper subset of subjects (the treatment group) are exposed to an advertising campaign, and the remaining subset of subjects (the control group) are not exposed to the advertising campaign.

Various techniques can be used to divide subjects into control and treatment groups. Some techniques cluster subjects according to geography, i.e., where the subjects live. For example, some experiments cluster subjects according to pre-defined designated market areas (DMAs) and then designate some of the DMAs as the treatment group and some of the DMAs as the control group.

Different techniques for clustering subjects are more effective in different geographic areas, and for different experiments. However, it can be difficult to objectively evaluate a particular set of clusters resulting from a particular clustering algorithm.

SUMMARY

In general, one innovative aspect of the subject matter described in this specification can be embodied in methods that include the actions of storing data identifying a plurality of geographic entities; using a first clustering algorithm to cluster the plurality of entities into a first set of clusters; identifying whether each geographic entity in the plurality of geographic entities is an ambiguously classified entity or a definitively classified entity, wherein an ambiguously classified entity is a geographic entity that is clustered into one of the clusters in the first set of clusters and is within a threshold distance of another geographic entity in one of the other clusters in the first set of clusters, and wherein a definitively classified entity is a geographic entity that is clustered into one of the clusters in the first set of clusters and is more than a threshold distance from each geographic entity in each of the other clusters in the first set of clusters; and determining a first cluster measurement for the first set of clusters, wherein the first cluster measurement is derived from a quantification of an attribute of each of the definitively classified entities and a quantification of the same attribute of each of the ambiguously classified entities. Other embodiments of this aspect include corresponding systems, apparatus, and computer programs recorded on computer storage devices, each configured to perform the operations of the methods.

These and other embodiments can each optionally include one or more of the following features. The actions can include using a second clustering algorithm to cluster the plurality of entities into a second set of clusters; determining a second cluster measurement for the second set of clusters; comparing the first cluster measurement to the second cluster measurement; and selecting either the first set of clusters or the second set of clusters according to the comparison. The first clustering algorithm and the second clustering algorithm can use a same clustering technique, the first clustering algorithm can generate a first number of clusters, the second clustering algorithm can generate a second number of clusters, and the first number of clusters and the second number of clusters are different. Determining the first cluster measurement for the first set of clusters can include dividing a sum of the quantification of the attribute of each of the definitively classified entities by a sum of the quantification of the attribute of each of the definitively classified entities and the quantification of the same attribute of each of the ambiguously classified entities. The sum of the quantifications of the attribute of each of the definitively classified entities can be a number of definitively classified entities. Determining the first cluster measurement for the first set of clusters can include dividing the quantification of the attribute of each of the ambiguously classified entities by a sum of the quantification of the attribute of each of the definitively classified entities and the quantification of the same attribute of each of the ambiguously classified entities. Determining the first cluster measurement for the first set of clusters can include determining an individual measurement for each cluster in the first set of clusters, wherein the individual measurement for a cluster is derived from a quantification of the attribute of each of the definitively classified entities in the cluster and a quantification of the attribute of each of the ambiguously classified entities in the cluster; and deriving the first cluster measurement from a number of clusters in the first set of clusters that have an individual measurement that exceeds a threshold. The first cluster measurement can be the number of clusters in the first set of clusters that have an individual measurement that exceeds the threshold divided by a total number of clusters in the first set of clusters.

The quantification of the attribute of an entity can be a population associated with the entity. The quantification of an attribute of an entity can be an experiment-specific metric calculated for each of the entity. The experiment specific metric for an entity can be a population of the entity that is determined to be relevant to an advertising experiment. The relevant population can be a population of users satisfying particular demographic criteria. The relevant population can be an estimated population of users that satisfy particular behavioral criteria. The quantification of the attribute of an entity can be a volume of sales that are relevant to the advertising experiment and made in one or more physical stores located within physical boundaries associated with the entity. Each geographic entity can be a city.

In general, another innovative aspect of the subject matter described in this specification can be embodied in methods that include the actions of storing data identifying a plurality of geographic entities; evaluating a respective set of clusters for each of a plurality of clustering algorithms, the evaluating comprising, for each clustering algorithm: clustering the plurality of entities into a respective set of clusters using the clustering algorithm; identifying whether each geographic entity in the plurality of geographic entities is an ambiguously classified entity or a definitively classified entity, wherein an ambiguously classified entity is a geographic entity that is clustered into one of the clusters in the respective set of clusters and is within a threshold distance of another geographic entity in one of the other clusters in the respective set of clusters, and wherein a definitively classified entity is a geographic entity that is clustered into one of the clusters in the first set of clusters and is more than a threshold distance from each geographic entity in each of the other clusters in the respective set of clusters; determining a cluster measurement for the respective set of clusters, wherein the cluster measurement is derived from a quantification of an attribute of each of the definitively classified entities and a quantification of the same attribute of each of the ambiguously classified entities; and selecting one of the respective sets of clusters according to the cluster measurements for the clustering algorithms. Other embodiments of this aspect include corresponding systems, apparatus, and computer programs recorded on computer storage devices, each configured to perform the operations of the methods.

In general, another innovative aspect of the subject matter described in this specification can be embodied in methods that include the actions of storing data identifying a plurality of geographic entities; using a first clustering algorithm to cluster the plurality of entities into a first set of clusters; determining an accuracy probability for each geographic entity in the plurality of geographic entities, wherein the accuracy probability for a particular geographic entity is determined according to a distance from the particular geographic entity to a closest geographic entity in that is in a different cluster than the particular geographic entity; and determining a first cluster measurement for the first set of clusters, wherein the first cluster measurement is derived from a quantification of an attribute of each of the geographic entities weighted by the accuracy probability for each clustered geographic entity. Other embodiments of this aspect include corresponding systems, apparatus, and computer programs recorded on computer storage devices, each configured to perform the operations of the methods.

These and other embodiments can each optionally include one or more of the following features. The quantification of the attribute of each geographic entity can be a population associated with the geographic entity. The actions can further include using a second clustering algorithm to cluster the plurality of entities into a second set of clusters; determining a second cluster measurement for the second set of clusters; comparing the first cluster measurement to the second cluster measurement; and selecting either the first set of clusters or the second set of clusters according to the comparison. Determining the first cluster measurement can include multiplying the quantification of the attribute of each geographic entity by the accuracy probability for the entity, resulting in individual products, summing the individual products, resulting in a sum, and dividing the sum by a total quantification of the attribute for all of the geographic entities. Determining the first cluster measurement can include determining an individual measurement for each cluster in the first set of clusters, wherein the individual measurement for a cluster is derived by multiplying the quantification of the attribute of each of the entities in the cluster by the accuracy probability for the entity, resulting in individual products, summing the individual products, resulting in a sum, and dividing the sum by a total quantification of the attribute of each of the entities in the cluster, and deriving the first cluster measurement from a number of clusters in the first set of clusters that have an individual measurement that exceeds a threshold. The accuracy probability for a geographic entity can be 1 if the geographic entity is less than a threshold distance from the closest geographic entity in the different cluster, and can be 0 otherwise.

In general, another innovative aspect of the subject matter described in this specification can be embodied in methods that include the actions of storing data identifying a plurality of geographic entities; incrementally generating clusters of the plurality of geographic entities by identifying a plurality of clusters, and repeating the following actions until a threshold condition is satisfied: selecting a cluster and assigning one of the plurality of geographic entities to the selected cluster, wherein the assigned geographic entity is the closest geographic entity to the selected cluster according to a distance metric; determining a cluster measurement for the resulting clusters from a quantification of an attribute of each geographic entity assigned to a cluster; storing cluster data associating a number of geographic entities assigned to clusters and the determined cluster measurement; and analyzing the determined cluster measurement for each of one or more of the number of geographic entities to select a particular number of geographic entities. Other embodiments of this aspect include corresponding systems, apparatus, and computer programs recorded on computer storage devices, each configured to perform the operations of the methods.

In general, another innovative aspect of the subject matter described in this specification can be embodied in methods that include the actions of storing data identifying a plurality of geographic entities; assigning each of the plurality of geographic entities to one of a plurality of clusters using a k-means clustering algorithm, wherein the k-means clustering algorithm determines a distance between a geographic entity and a centroid of a cluster according to both a population associated with the geographic entity and a physical distance between physical coordinates associated with the geographic entities and the centroid of the cluster; and storing data associating each cluster with the geographic entities in the cluster. Other embodiments of this aspect include corresponding systems, apparatus, and computer programs recorded on computer storage devices, each configured to perform the operations of the methods.

These and other embodiments can each optionally include one or more of the following features. The k-means clustering algorithm can determine a distance between a geographic entity and a centroid of a cluster according to both a log of a population associated with the geographic entity and a physical distance between physical coordinates associated with the geographic entities and the centroid of the cluster.

In general, another innovative aspect of the subject matter described in this specification can be embodied in methods that include the actions of clustering a plurality of geographic entities into a set of initial clusters, each cluster having a respective centroid, wherein each geographic entity and each cluster centroid has a respective associated physical location; identifying a pair of adjacent clusters from the set of initial clusters, wherein the pair of adjacent clusters comprises a first cluster of one or more first geographic entities and a second cluster of one or more second geographic entities, wherein at least one first geographic entity has a physical location that is closer to a physical location of a second geographic entity than to a physical location of any entity in any cluster other than the first cluster and the second cluster has an associated physical location that is between the associated physical location for the first geographic entity and the associated physical location for the second geographic entity, and wherein the first cluster has a first centroid and the second cluster has a second centroid; determining a division between the associated physical location of the first centroid and the associated physical location of the second centroid; generating a set of redefined clusters, the generating including reassigning one or more of the first geographic entities in the first cluster to the second cluster, wherein the associated physical location of each reassigned first geographic entity is separated from the physical location of the first centroid by the division; and determining a cluster measurement for the set of redefined clusters, wherein the cluster measurement is derived from a quantification of an attribute of definitively classified entities in the set of redefined clusters and a quantification of the same attribute of ambiguously classified entities in the set of redefined clusters. Other embodiments of this aspect include corresponding systems, apparatus, and computer programs recorded on computer storage devices, each configured to perform the operations of the methods.

These and other embodiments can each optionally include one or more of the following features. Generating the set of redefined clusters can include reassigning one or more of the second geographic entities in the second cluster to the first cluster, wherein the associated physical location of each reassigned second geographic entity is separated from the physical location of the second centroid by the division. Determining the division can include identifying a line that is perpendicular to a line between the first centroid and the second centroid and that is a predetermined distance d from the first centroid. The actions can further include repeating, for each of multiple predetermined distances d, the determining the division, generating a set of redefined clusters, and determining a cluster measurement; and selecting one of the sets of redefined clusters according to the determined cluster measurements. The actions can further include updating the first centroid and the second centroid according to the selected set of redefined clusters. The actions can further include identifying all adjacent clusters in the set of initial clusters and, for each cluster, determining a division between the centroids of the clusters in the pair of clusters, generating another set of redefined clusters, and determining another cluster measurement for the set of redefined clusters.

Particular embodiments of the subject matter described in this specification can be implemented so as to realize one or more of the following advantages. Objective measurements for comparing clusters generated using different clustering algorithms and variations of the same clustering algorithm can be used. These measurements can reflect experiment-specific metrics that impact experiment success. Various tradeoffs between desired features of an experiment can be used to select the metrics.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Geography-Based Experiment System

Figure 1:
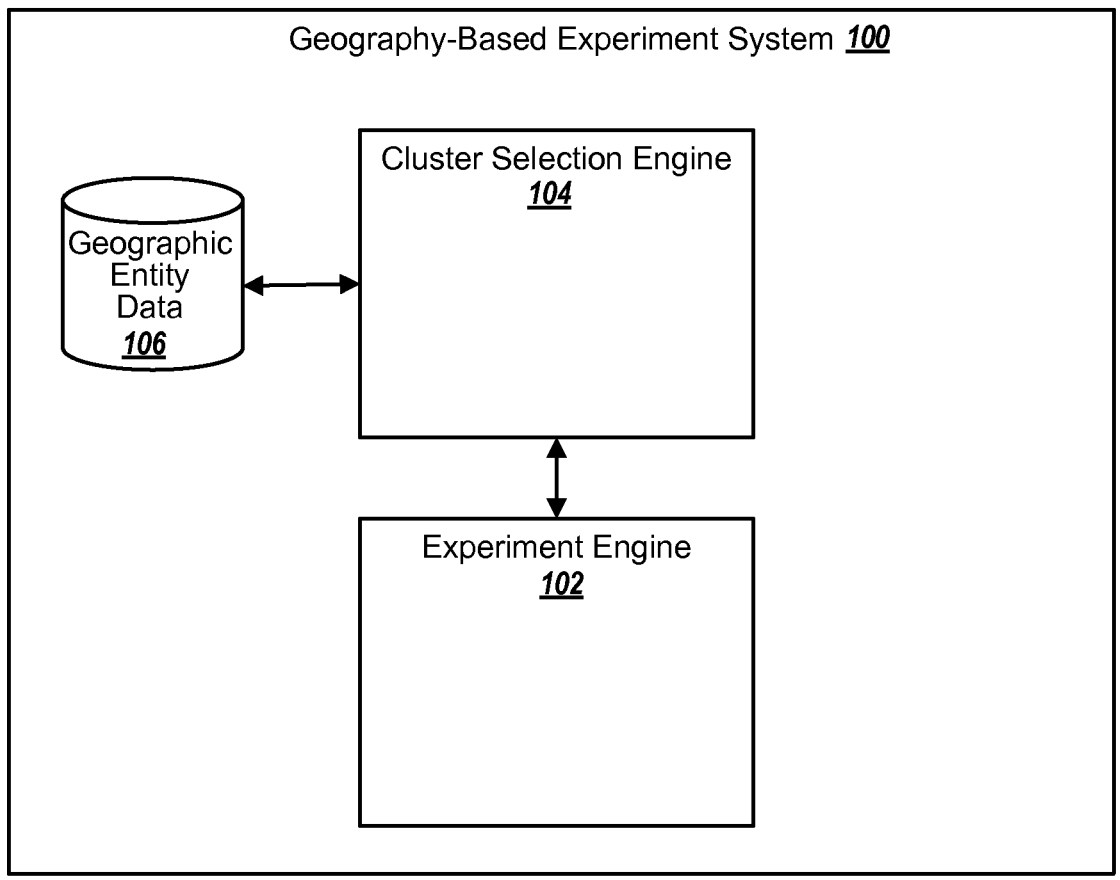
FIG. 1 is a block diagram of an example geography-based experiment system that selects between sets of clusters and performs geography-based experiments using the selected set of clusters.

FIG. 1 is a block diagram of an example geography-based experiment system 100 that selects between sets of clusters generated using various geographic entity clustering algorithms and performs geography-based experiments using the selected set of clusters. A geographic entity is a discrete geographic area with an associated physical location. For example, a geographic entity can be a city, a state, a country, a province, or a region associated with a particular zip code. The geography-based experiment system 100 is implemented as one or more software programs executing on one or more computers.

The geography-based experiment system 100 includes an experiment engine 102 that performs experiments and a cluster selection engine 104 that selects a set of clusters. The experiment engine 102 performs a geography-based experiment by assigning some of the clusters of geographic entities to be treatment clusters and other clusters of geographic entities to be control clusters. Subjects in geographic entities in the treatment clusters are exposed to the advertising campaign, and subjects in geographic entities in the control clusters are not exposed to the advertising campaign.

A subject is exposed to an advertising campaign, for example, when an advertisement in the advertising campaign is displayed on a computer of the subject, on a television viewed by the subject, or on a billboard viewed by a subject. The experiment engine 102 exposes subjects in treatment clusters to an advertising campaign and does not expose subjects in control clusters to the advertising campaign by, for example, only displaying advertisements in the advertising campaign on computers having an IP address that is believed to be associated with one of the treatment clusters, only displaying the advertisements in television broadcasts directed to geographic entities within the treatment clusters, or only presenting the advertisements on billboards physically located within the boundaries of the geographic entities in the treatment clusters.

The techniques for controlling exposure to the advertising campaign may not be precise; for example, a subject who lives in a control cluster but works in a treatment cluster might be exposed to the advertisement during his time in the treatment cluster, even though the subject is from a geographic entity in a control cluster. Similarly, a subject who lives in a treatment cluster but does not use a computer may not be exposed to online advertisements even though the subject is from a geographic entity in a treatment cluster. In some implementations, the experiment engine 102 only controls exposure to particular types of advertising. For example, the experiment engine 102 can limit exposure to online advertising to subjects believed to be in a treatment cluster, but not limit billboard advertising or television advertising.

The experiment engine 102 then tracks the behavior of subjects in the treatment clusters and subjects in the control clusters to determine how aggregate subject behavior is affected by being exposed to the advertising campaign. For example, the experiment engine 102 can conduct a randomized experiment, wherein some of the clusters from the selected set of clusters are control clusters and other clusters from the selected set of clusters are treatment clusters. In some implementations, the experiment engine 102 designs the experiment, for example, according to one or more user-specified parameters. These parameters can also be used by the cluster selection engine 104 to evaluate the one or more clusters.

The cluster selection engine 104 analyzes candidate geographic entity clustering algorithms, selects a best set of clusters resulting from one of the algorithms, and provides the selected clusters to the experiment engine 102. The cluster selection engine 104 generates sets of clusters of geographic entities using each candidate clustering algorithm that is being considered, and then evaluates the sets of clusters resulting from each clustering algorithm by generating a cluster measurement for the sets of clusters. Example clustering algorithms are described in more detail below with reference to §2.0, and example evaluation methods are described in more detail below with reference to §3.0.

As part of the clustering and evaluating, the cluster selection engine 104 uses geographic entity data 106. The geographic entity data 106 describes each geographic entity being clustered. The description for a given geographic entity includes the physical coordinates of boundaries associated with the geographic entity and optionally the physical coordinates of the center of the geographic entity. The data can optionally include other descriptive details for the geographic entity, for example, the population of the geographic entity, the volume of internet activity in the geographic entity (e.g., a search volume or a volume of visits to particular web sites), the number of businesses of a particular type that are located within the geographic entity, and any sub-entities associated with the geographic entity.

A sub-entity is a geographic region that is located inside the physical boundaries of a geographic entity, and for which separate data, e.g., population data, etc. is available. For example, the San Francisco, Calif. area includes the cities of San Francisco, South San Francisco, Redwood City, and Menlo Park. The cluster selection engine 104 can use the San Francisco, Calif. area as a representative geographic entity for a region that includes the sub-entities of San Francisco, South San Francisco, Redwood City, and Menlo Park. The cluster selection engine 104 can choose to associate each of the sub-entities entities with the San Francisco, Calif. area, as opposed to another geographic entity, because they are closer to San Francisco, Calif. than any other geographic entity used by the cluster selection engine.

A given clustering algorithm can use the physical coordinates defined by the San Francisco, Calif. area as a whole (e.g., coordinates that reflect the inclusion of San Francisco, South San Francisco, Redwood City, and Menlo Park) when performing the clustering. The clustering algorithm can be evaluated by how well it clusters the individual sub-entities, i.e., the clustering evaluations can be performed on a different scale than the clustering itself. This can result in more efficient clustering and more accurate evaluation of the resulting clusters.

Once the cluster selection engine 104 selects a set of clusters, it provides the selected clusters to the experiment engine 102.

§2.0 Example Geographic Entity Clustering Algorithms

Figure 2:
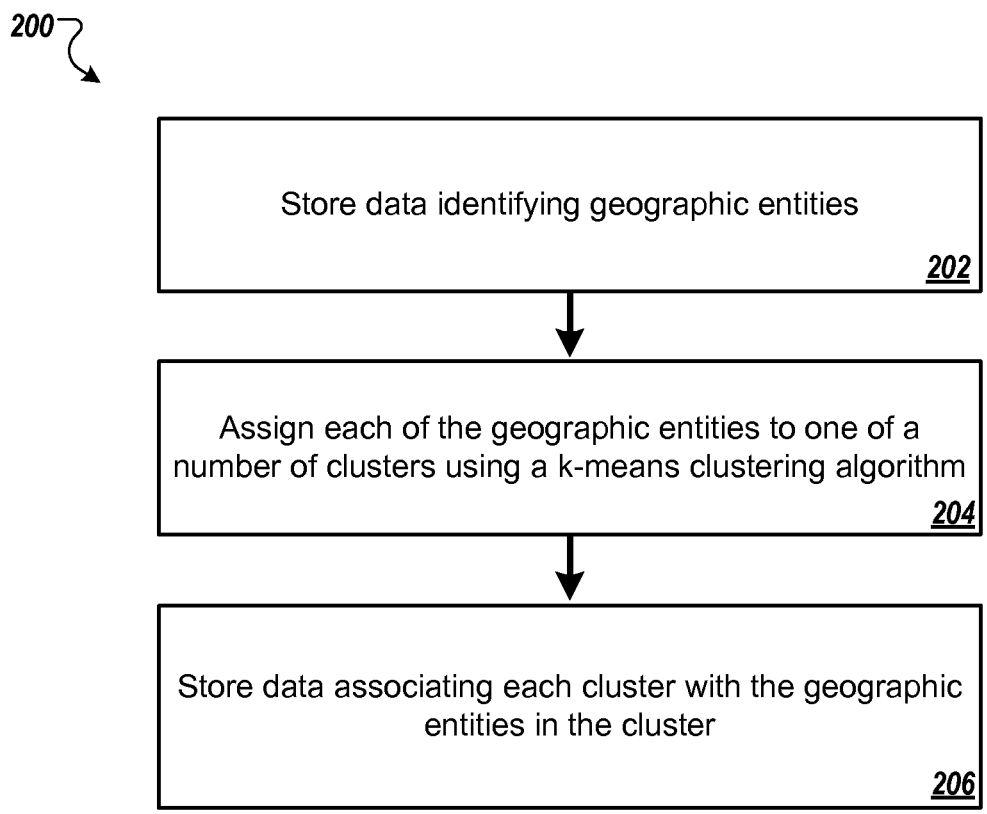
FIG. 2 is a flow diagram of an example process for clustering geographic entities.

FIG. 2 is a flow diagram of an example process 200 for clustering geographic entities. The process 200 can be implemented, for example, by the system 100, described above with reference to FIG. 1.

The process 200 stores data identifying geographic entities (202), for example, as described above with reference to FIG. 1. The system assigns each of the geographic entities to one of a number of clusters using a k-means clustering algorithm (204). The system stores data associating each cluster with the geographic entities in the cluster (206).

A k-means clustering algorithm attempts to minimize a total distance metric, e.g., a cluster sum of squares metric, for the clusters. The metric is based on a distance between each geographic entity and the centroid of the cluster to which the entity is assigned.

The k-means clustering algorithm first selects k locations to be centroids for each of k clusters. In some implementations, the locations are geographic entities are selected at random. In other implementations, the locations are determined according to a heuristic, for example, to maximize the distance between the selected centroids according to a distance metric.

The algorithm assigns each of the geographic entities to a respective cluster whose centroid is the closest to the geographic entity according to a distance metric. The algorithm then updates the centroids for each cluster and re-assigns the geographic entities to the cluster having an updated centroid that is the closest to the geographic entity, according to the distance metric. The k-means clustering algorithm repeats the updating of the centroids and the reassignment of the geographic entities until no geographic entities are reassigned, or until a convergence criterion or predefined iteration limit is met. In some implementations, the process is then repeated using a different set of initial cluster centroids.

Various distance metrics can be used. In some implementations, the distance metric is derived from the physical distance between the coordinates associated with a geographic entity and the centroid of a cluster. For example, geographic entity data can indicate the center of a geographic entity, or the center of the geographic entity can be determined from data identifying the boundaries of the entity. The distance metric can be the distance between the center of the geographic entity and the centroid itself, or the square of the distance.

In some implementations, the distance metric is derived from the physical distance between the coordinates associated with a geographic entity and the centroid of a cluster as well as the population of the geographic entity. For example, the distance measure can be the distance between the entity and the cluster centroid weighted by the population, or the log of the population, of the geographic entity. One example distance measure is as follows:

$$d(\mu,e) = p_e[(\mu_x-e_x)^2 + (\mu_y-e_y)^2],$$

where $d(\mu, e)$ is the distance metric for a geographic entity $e$ and a centroid $\mu$ of a given cluster, $p_e$ is the log of the population of geographic entity $e$, $\mu_x$ and $\mu_y$ are the x and y coordinates of the centroid $\mu$, and $e_x$ and $e_y$ are the x and y coordinates of the center of geographic entity $e$.

Other weights can alternatively or additionally be used. For example, the physical distance can be weighted by the population of the entity itself and the populations of nearby clusters. As another example, the physical distances can be weighted by a metric of an attribute of the geographic entity, for example, a volume of internet activity for users in the geographic entity.

Another example distance metric is derived from a number, or a quantification of an attribute, of entities that are within a threshold distance of a particular entity and in a different cluster than the particular entity. For example, the distance metric for a particular geographic entity can be the sum of a metric calculated for each neighboring geographic entity within a threshold distance of the particular geographic entity and located in a different cluster than the geographic entity. The metric for each neighboring geographic entity can be the distance between the neighboring geographic entity and the particular geographic entity for which the distance metric is being calculated, or can be the population of the neighboring geographic entity divided by the physical distance, or the square of the physical distance, between the neighboring geographic entity and the particular geographic entity for which the distance metric is being calculated.

As another example, the distance metric can be derived from the distance between the geographic entity and geographic entities in other clusters, e.g., the population of the geographic entity divided by the sum of the physical distances between the geographic entity and each geographic entity in another cluster.

While FIG. 2 describes one possible type of clustering algorithm, other types of clustering algorithms can also be used. For example, a clustering algorithm that groups geographic entities according to DMAs can be used. Other example clustering algorithms include fuzzy c-means clustering algorithms, QT clustering algorithms, hierarchical clustering algorithms, spectral clustering, and various ad hoc manual clustering techniques. Yet another example clustering algorithm that incrementally builds the clusters is described below with reference to FIG. 10. Other techniques, for example, to balance clusters in terms of various attributes of the entities, e.g., population, internet traffic, number of stores, or volume of sales, can also be used.

Figure 3:
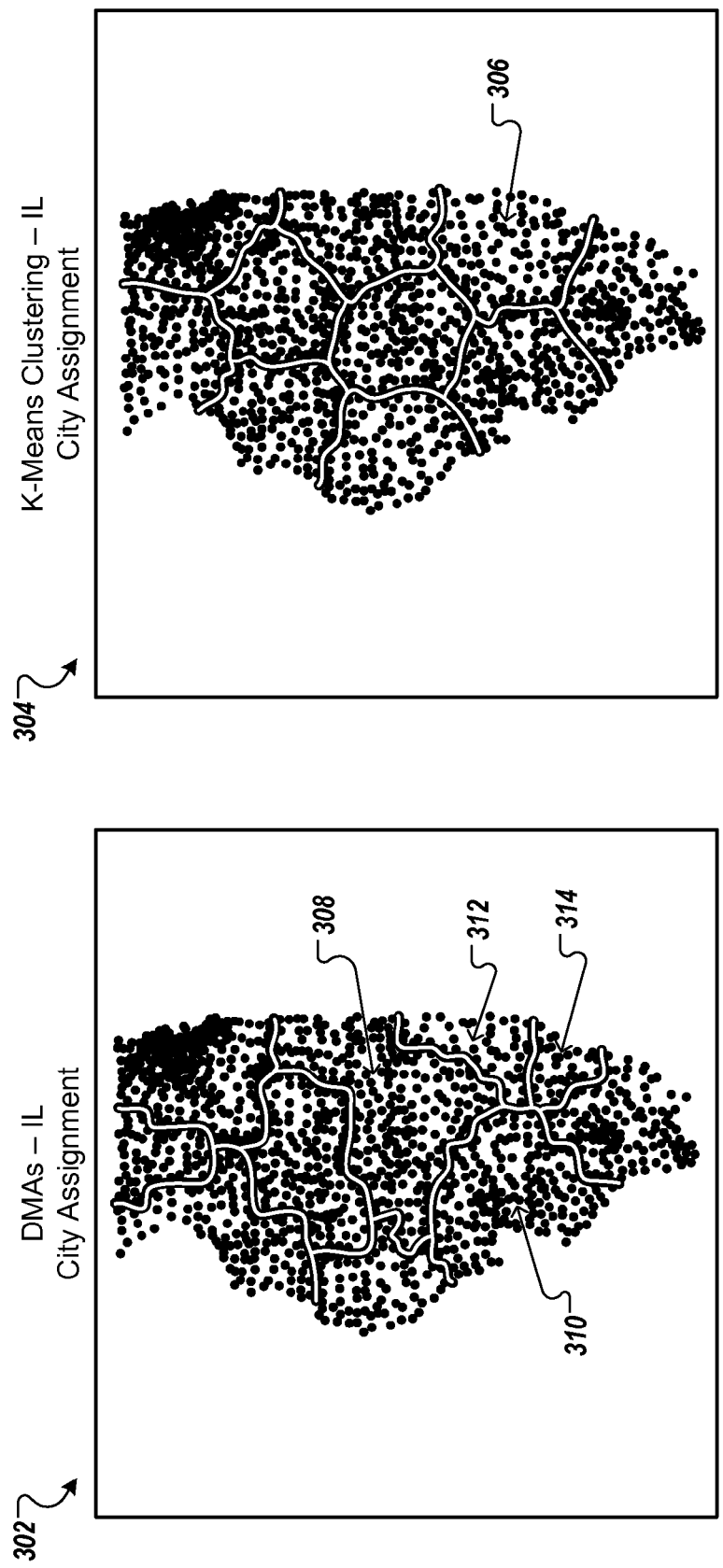
FIG. 3 illustrates two plots of example sets of clusters of cities generated using two different clustering algorithms.

§2.1 Example Comparison of Clusters Generated Using Two Different Clustering Algorithms FIG. 3 illustrates two plots of example sets of clusters of cities generated using two different clustering algorithms. Clustering algorithms are different when they use different clustering techniques, e.g., a k-means clustering algorithm is different from a fuzzy c clustering algorithm. Clustering algorithms can also be different when they use the same clustering technique with different clustering parameters, e.g., a k-means clustering algorithm that generates three clusters is different from a k-means clustering algorithm that generates eight clusters. While FIG. 3 illustrates clustering cities, clusters of other geographic entities, for example, neighborhoods, zip codes, counties, or regions can also be used.

The plot 302 displays clusters generated using a designated market area (DMA) clustering algorithm. The designated market area (DMA) clustering algorithm is an ad hoc clustering algorithm that clusters cities according to their DMA associations. The plot 304 displays clusters resulting from a weighted k-means clustering algorithm, as described above with reference to FIG. 2.

Although both algorithms started with the same set of cities as input, the clusters resulting from the DMA clustering algorithm and the k-means clustering algorithm are different. For example, cluster 306 in plot 304 includes cities that are in four separate clusters in plot 302 (clusters 308, 310, 312, and 314).

The different sets of clusters that result from the two clustering algorithms can result in different results from an experiment. This can occur, for example, when subjects are misclassified as being from a treatment cluster or a control cluster according to one set of clusters, but not another set of clusters. There can be uncertainty in the location of a subject, for example, when a less than precise technique, such as some geolocation methods, are used. Therefore, if a first clustering algorithm generates clusters so that many subjects from a particular cluster could be mistaken for subjects from a different cluster, then an effect of the advertisement may be mis-interpreted if the clusters generated by the first algorithm are used.

However, it is difficult to evaluate clusters from a mere side-by-side comparison. An objective measure for evaluating sets of clusters is needed. An example cluster measurement used to evaluate clusters is described below in §3.0.

§3.0 Evaluating Clustering Algorithms

As illustrated in FIG. 3, different clustering algorithms can result in different sets of clusters. Therefore, an objective measurement of the sets of clusters resulting from different clustering algorithms is needed so that the different sets of clusters can be evaluated and compared.

Figure 4:
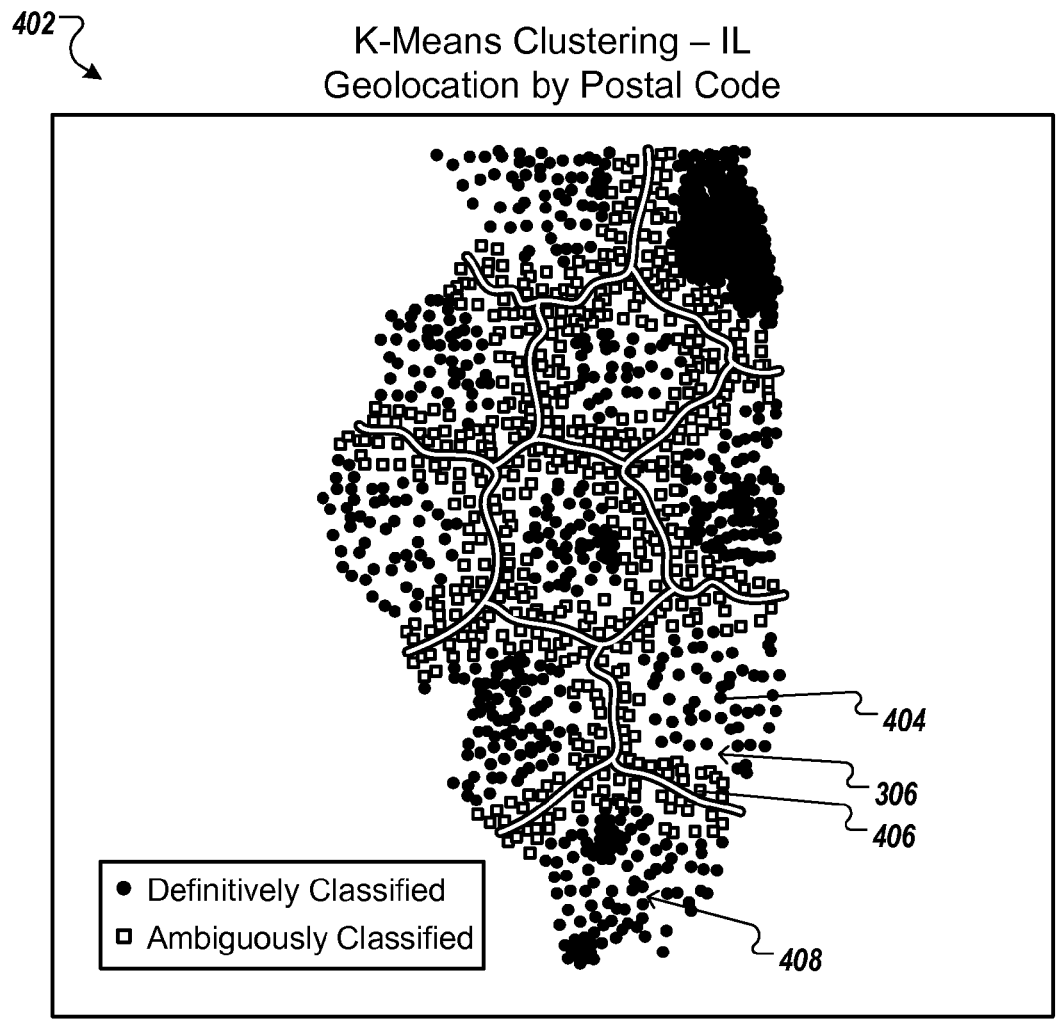
FIG. 4 illustrates an example plot of accurately and inaccurately classified geographic entities, along with the boundaries of the clusters for the entities.

§3.1 Identifying Definitively Classified Geographic Entities and Ambiguously Classified Geographic Entities FIG. 4 illustrates an example plot 402 of definitively and ambiguously classified geographic entities, along with the boundaries of the clusters for the entities. The clusters illustrated in FIG. 4 correspond to the clusters 304 illustrated in FIG. 3, generated using a weighted k-means clustering algorithm.

Each geographic entity shown in the plot 402 is either a definitively classified geographic entity or an ambiguously classified geographic entity. A definitively classified entity is an entity that is more than a threshold distance metric, e.g., twenty miles, from a geographic entity in any cluster other than the cluster to which it is assigned. The distance metric can be distance itself, or a value derived from the distance. The distance between two geographic entities can be measured, for example, from the center of the physical region corresponding to the geographic entities. For example, geographic entity 404 is a definitively classified entity because it is at least a threshold distance away from geographic entities in the other clusters.

In some implementations, the threshold distance is selected so that the probability that a subject who is actually in a geographic entity in one cluster will be identified as being in a different cluster will be less than an acceptable threshold value. Subject locations can be mis-estimated with varying degrees of severity, depending on the particular technique used to estimate the subject locations. The probability can be calculated according to an evaluation of the accuracy of the technique used to identify the location of subjects. Example probability calculations for geolocation techniques are described in more detail below with reference to FIG. 6.

Ambiguously classified geographic entities are geographic entities that are less than the threshold distance from a geographic entity in a cluster other than their corresponding cluster. For example, geographic entity 406 is a ambiguously classified entity because it is in cluster 306 but is within a threshold distance of geographic entities in cluster 408.

Other measurements of accurately and inaccurately classified entities can also be used.

Figure 5:
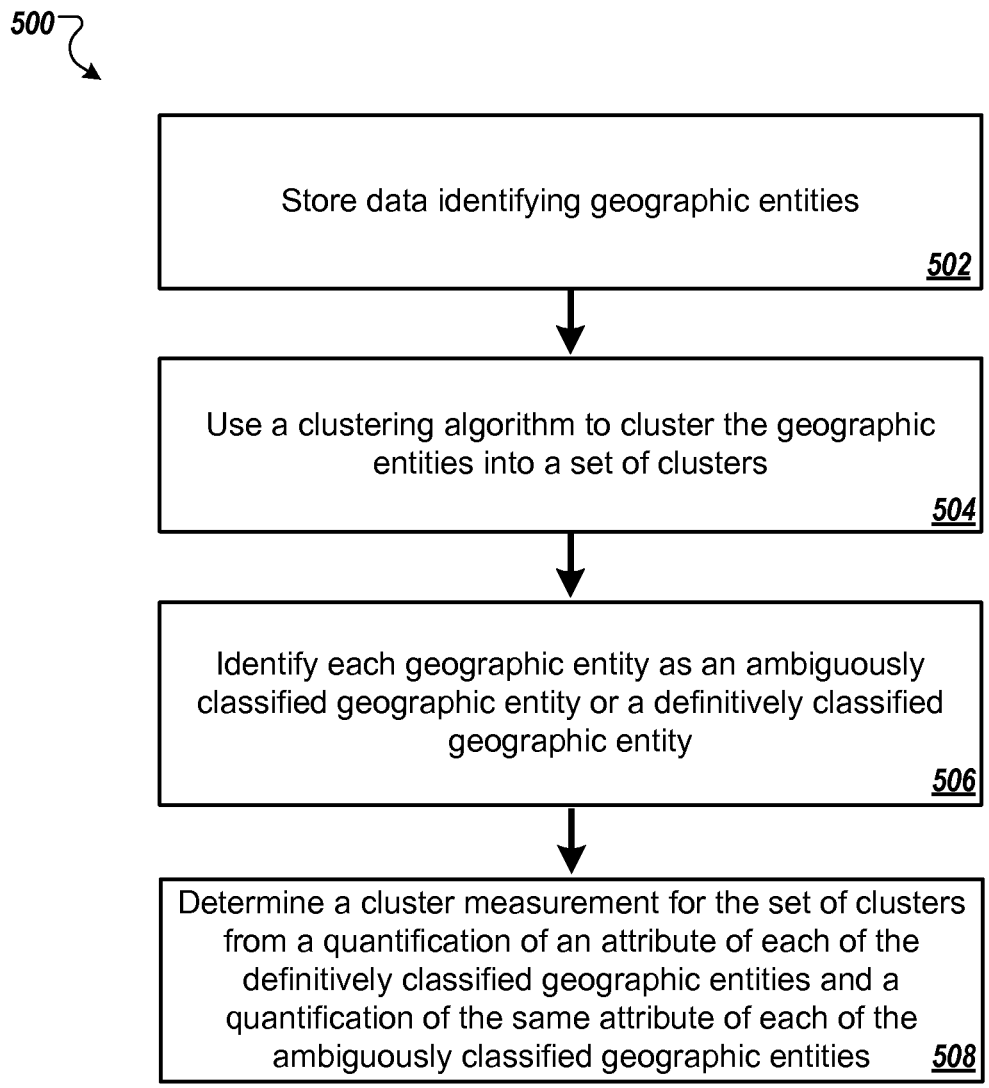
FIG. 5 is a flow diagram of an example process for evaluating a set of clusters generated using a single clustering algorithm.

§3.2 Example Processes for Evaluating a Set of Clusters Generated Using a Single Clustering Algorithm FIG. 5 is a flow diagram of an example process 500 for evaluating a set of clusters generated using a single clustering algorithm. The clusters are evaluated according to a quantification of an attribute of the definitively classified geographic entities and a quantification of an attribute of the ambiguously classified geographic entities. The process 500 can be implemented, for example, by the system 100, described above with reference to FIG. 1.

The process 500 stores data identifying geographic entities (502), for example, as described above with reference to FIG. 1. The process 500 uses a clustering algorithm to cluster the geographic entities into a set of clusters (504). For example, one of the clustering algorithms described above with reference to §2.0, or another clustering algorithm, can be used.

The process 500 identifies each geographic entity as an ambiguously classified geographic entity or a definitively classified geographic entity (506). A definitively classified geographic entity is an entity that is more than a threshold distance from any geographic entities in clusters other than the cluster into which it was classified, as described above with reference to FIG. 4. An ambiguously classified geographic entity is an entity that is less than the threshold distance away from at least one geographic entity in a cluster other than the cluster into which it was classified, as described above with reference to FIG. 4.

The process 500 determines a cluster measurement for the set of clusters resulting from the clustering algorithm from a quantification of an attribute of each of the definitively classified geographic entities and a quantification of a same attribute of each of the ambiguously classified geographic entities (508).

In general, the quantification of the attribute is selected to reflect an expected impact on the experiment. This impact can be due to misclassifying subjects, e.g., inaccurately determining that a control subject is in a treatment cluster or vice versa. For example, if most of the ambiguously classified entities have a small population relative to the definitively classified entities, then the impact of misclassifying subjects from the ambiguously classified entities is less severe than it would be if the ambiguously classified entities had a larger population.

The impact can alternatively or additionally be due to misinterpreting user actions, for example, misclassifying a sale made to a subject from a treatment cluster as a sale made to a subject from a control cluster.

The process can use one or more of various attributes when determining the cluster measurement. The attributes can be selected to reflect an attribute of the entities that is important to the experiment, or the advertisement.

In some implementations, the process uses the population of the geographic entities as the quantification of the attribute of the geographic entities.

In some implementations, the process 500 uses an experiment-specific attribute to generate the cluster measurement. For example, the experiment-specific attribute can be a relevant population of the geographic entities. The relevant population can be, for example, the portion of the population satisfying particular demographic criteria or particular behavioral criteria. Example demographic criteria include income, sex, age, and race. Example behavioral criteria include, for example, an amount of time spent watching television or surfing the Internet, visiting particular Internet sites more than a threshold number of times, or watching particular television stations more than a particular amount of time during a given period. For example, if an advertiser is particularly interested in knowing the effect that exposure to its advertisements has on women who are over thirty-five and that spend at least an hour online every day, the relevant population is women over thirty-five that spend at least an hour online every day. The data for each geographic entity can be received, for example, from various commercial sources. These sources can include sources of population data. Alternatively or additionally, the sources can include data gathered by the experiment system itself, for example, Internet usage data indicating queries submitted by users or websites visited by users. This data is preferably anonymized to preserve user privacy.

As another example, the experiment-specific attribute can be an amount of Internet traffic, or Internet traffic to particular websites of interest, that comes from the geographic entities. A website of interest is a website that an advertiser has identified as being relevant to the products being advertised. In these implementations, the quantification of the attribute for a geographic entity is the total Internet traffic, or Internet traffic to particular websites of interest, from the geographic entity. Alternatively, the experiment-specific attribute could be the amount of television watched, or the amount of television on particular channels that is watched, by subjects in the geographic entities.

As yet another example, the experiment-specific attribute can be a number of physical stores relevant to the advertisement experiment that are located within the boundaries of the geographic entities. Physical stores relevant to the advertisement can be, for example, stores owned by the advertiser whose advertisements are being tested, or stores that sell products that are being advertised by the advertisements being tested. In these implementations, the quantification of the attribute for a geographic entity is the number of stores in the geographic entity.

As yet another example, the experiment-specific attribute can be a volume of sales, either in dollars or in number of items sold, from physical stores relevant to the advertisement that are located within the boundaries of the geographic entities.

Other quantifications of attributes across multiple entities, for example, the number of geographic entities themselves, can also be used.

Once the process 500 determines the quantifications of the attribute, the process 500 calculates the cluster measurement from the quantification of the attribute for the definitively classified entities and the quantification of the attribute for the ambiguously classified entities. In some implementations, the process calculates the cluster measurement by dividing the sum of the quantification of the attribute for the definitively classified entities by the sum of the quantification of the attribute for the definitively classified geographic entities and the ambiguously classified geographic entities.

In other implementations, the process calculates the cluster measurement by dividing the sum of quantification of the attribute for the ambiguously classified entities by the sum of the quantification of the attribute for the definitively classified geographic entities and the ambiguously classified geographic entities. In some implementations, the system subtracts the resulting quotient from 1.

In other implementations, rather than considering the quantifications of all of the definitively classified and/or ambiguously classified entities in the aggregate, the process 500 calculates an individual measurement for each cluster. For example, the process can divide the quantification of the attribute for the definitively classified entities associated with a given cluster by the quantification of the attribute for all of the entities in the cluster. As another example, the process can divide the quantification of the attribute for the ambiguously classified entities associated with a given cluster by the quantification of the attribute for all of the entities in the cluster. The process 500 can optionally subtract either of the quotients from 1. The process then calculates the cluster measurement from the individual measurement for each cluster. In some implementations, the cluster measurement is the number of clusters that have a measurement that satisfies, e.g., exceeds, a predetermined threshold. In other implementations, the cluster measurement is the percentage of the clusters that have a measurement that satisfies, e.g., exceeds, a predetermined threshold. The percentage of clusters can be calculated by dividing the number of clusters that have a measurement that satisfies the threshold by the total number of clusters in the set of clusters. In still other implementations, the cluster measurement is the number or percentage of clusters that have a measurement that satisfies the predetermined threshold and for which the sum of the quantification of the attribute used to generate the cluster measurement (or another attribute) of the geographic entities in the cluster satisfies another predetermined threshold.

The process 500 then evaluates the set of clusters using the cluster measurement. In some implementations, the system compares the cluster measurement to a benchmark value. For example, a cluster measurement can be generated for an algorithm based on the DMA clusters in the United States. This cluster measurement can then be used as a benchmark for all other clustering algorithms. If the set of clusters being evaluated has a cluster measurement that meets or exceeds the cluster measurement of the DMA clustering algorithm, the set of clusters can be determined to be sufficient.

In other implementations, the system generates similar cluster measurements for different sets of clusters resulting from other clustering algorithms and compares the cluster measurements to select one of the set of clusters. This comparison and selection process is described in more detail below in §3.3.

In some implementations, when the system classifies each geographic entity as a definitively classified entity or an ambiguously classified entity, the system also separately classifies each sub-entity associated with the geographic entity. The quantification of the attributes for the classified sub-entities can then be used to determine the cluster measurement for the set of clusters, e.g., according to the quantification of the attribute for definitively classified sub-entities and the quantification of the attribute for ambiguously classified sub-entities.

Figure 6:
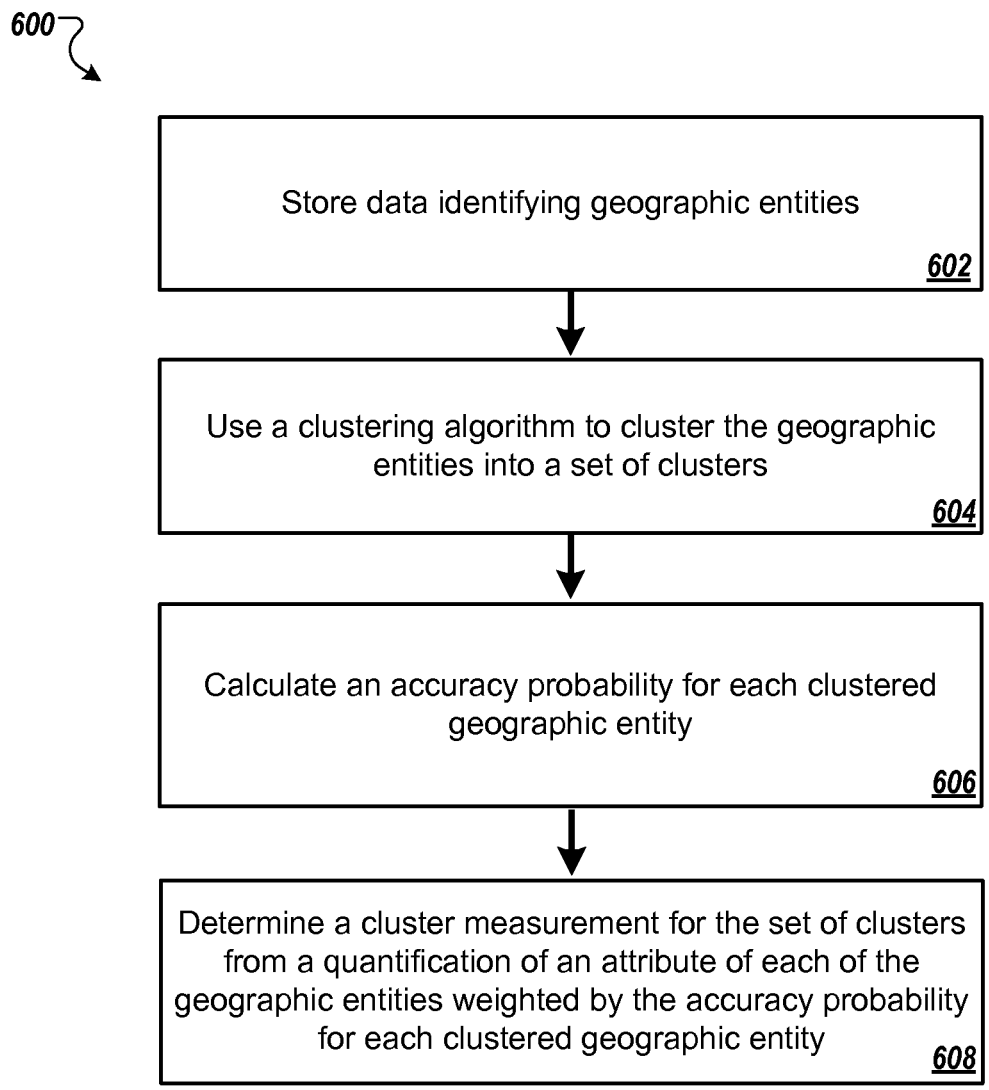
FIG. 6 is a flow diagram of an example process for evaluating a set of clusters generated using a single clustering algorithm according to an accuracy probability for each geographic entity.

FIG. 6 is a flow diagram of an example process 600 for evaluating a set of clusters generated using a single clustering algorithm according to an accuracy probability for each geographic entity. The process 600 can be implemented, for example, by the system 100, described above with reference to FIG. 1.

The process 600 stores data identifying geographic entities (602), for example, as described above with reference to FIG. 1. The process 600 uses a clustering algorithm to cluster the geographic entities into a set of clusters (604), for example, as described above with reference to FIG. 5.

The process 600 calculates an accuracy probability for each clustered geographic entity. In some implementations, the accuracy probability for a geographic entity is the probability that a subject in the geographic entity will be definitively classified as being in the same cluster as the geographic entity (e.g., that the geographic entity is a definitively classified geographic entity). In other implementations, the accuracy probability for a geographic entity is the probability that a subject in the geographic entity will be classified as being in a different cluster than the geographic entity (e.g., that the geographic entity is an ambiguously classified geographic entity).

The process 600 can calculate the accuracy probability for a given geographic entity according to the distance from the geographic entity to the closest geographic entity that is in a different cluster. For example, the process 600 can store data corresponding to a distance-based probability distribution that specifies the appropriate probability for different distances between geographic entities, and then select the probability corresponding to the distance from the geographic entity to the closest geographic entity that is in a different cluster.

In some implementations, the probability distribution is derived from an empirical analysis of how well an advertising experiment system can estimate the location of a subject. For example, if the advertising experiment system uses geotargeting to estimate the location of a subject from the IP address used by the subject, the probability distribution can reflect how accurate the geotargeting is believed to be. Data on the accuracy of the geotargeting can be generated by comparing where a subject actually is and where the geotargeting predicts that the user is, e.g., by determining the distance between the two locations for each subject. The probability distribution can then be generated from an analysis of this data by determining how often the geotargeting accurately predicts the subject's location within various distance thresholds. While the below example describes dividing distances into discrete buckets of less than or equal to five miles, less than or equal to ten miles, and less than or equal to twenty miles, in some implementations the probability distribution is instead a continuous distribution.

Consider an example where the accuracy probability estimates the probability that a subject in a geographic entity is identified as being in the same cluster as the cluster for the geographic entity. Assume that the geotargeting accuracy data indicates that the system accurately predicted the location of ten subjects within five or less miles, accurately predicted the location of twenty-five total subjects within ten or less miles, and accurately predicted the location of thirty-five total subjects within twenty or less miles, and did not accurately predict the location of five total subjects within twenty or less miles. The accuracy probability distribution can then be determined as follows. The accuracy probability if the distance is less than or equal to five miles is 10/40=0.25, because the estimated locations of ten of the forty subjects was within five miles of the actual locations of the subjects. Similarly, the accuracy probability if the distance is less than or equal to ten miles is 25/40=0.625, and the accuracy probability if the distance is less than or equal to twenty miles is 35/40=0.875.

The process 600 then determines a cluster measurement for the set of clusters generated using the clustering algorithm from a quantification of an attribute of each of the geographic entities weighted by the accuracy probability for each clustered geographic entity. The quantification of the attribute of each of the geographic entities can be one of the quantifications described above with reference to FIG. 5.

In some implementations, the process determines the cluster measurement by multiplying the quantification of the attribute for each geographic entity by the accuracy probability for the entity, summing the resulting products, and dividing the sum by the total quantification of the attribute for all of the geographic entities. In some implementations, the system further subtracts the resulting quotient from 1.

In other implementations, the process determines the cluster measurement by determining individual measurements for the clusters. The system determines the individual measurement for a cluster by multiplying the quantification of the attribute for each geographic entity in the cluster by the accuracy probability for the entity, summing the resulting products, and dividing the sum by the total quantification of the attribute for all of the geographic entities in the cluster. The process then calculates the cluster measurement from the individual measurement for each cluster. In some implementations, the cluster measurement is the number of clusters that have a measurement that satisfies, e.g., exceeds, a predetermined threshold. In other implementations, the cluster measurement is the percentage of the clusters that have a measurement that satisfies, e.g., exceeds, a predetermined threshold. The percentage of clusters can be calculated by dividing the number of clusters that have a measurement that satisfies the threshold by the total number of clusters in the set of clusters. In still other implementations, the cluster measurement is the number or percentage of clusters that have a measurement that satisfies the predetermined threshold and for which the sum of the quantification of the attribute used to generate the cluster measurement (or another attribute) of the geographic entities in the cluster satisfies another predetermined threshold.

In some implementations, the probability distribution assigns a probability of 1 when the distance is less than a threshold distance and a probability of 0 when the distance is greater than a threshold distance. In these implementations, the outcome of the process 600 can be the same as the outcome of the process 500, for the same distance threshold.

Figure 7:
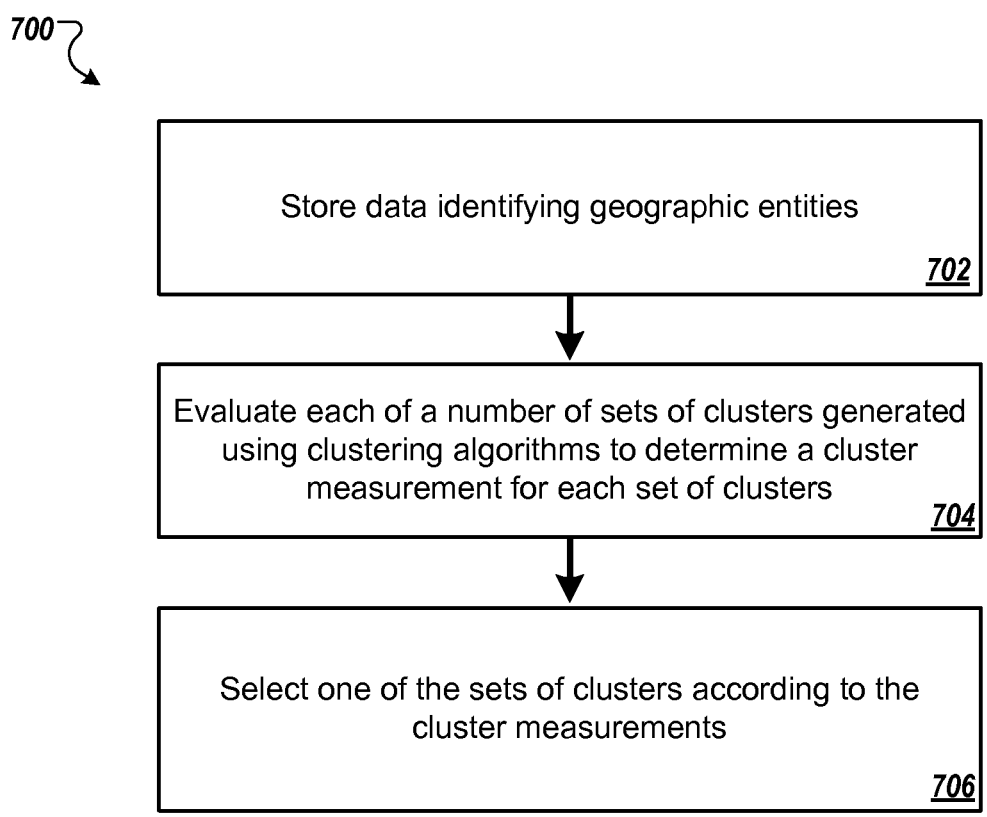
FIG. 7 is a flow diagram of an example process for comparing different sets of clusters.

§3.3 Example Process for Comparing Sets of Clusters Generated Using Different Clustering Algorithms FIG. 7 is a flow diagram of an example process 700 for comparing different sets of clusters. The process 700 can be implemented, for example, by the system 100, described above with reference to FIG. 1.

The process 700 stores data identifying geographic entities (702), for example, as described above with reference to FIG. 1. The system evaluates each of a number of sets of clusters generated using different clustering algorithms to determine a cluster measurement for each set of clusters (704), for example, as described above with reference to FIG. 5. The clustering algorithms whose clusters are being compared can be different clustering algorithms, for example, a k-means clustering algorithm and a DMA-based clustering algorithm. The clustering algorithms whose clusters are being compared can also be the same clustering algorithm modified to generate different numbers of clusters, for example, a k-means clustering algorithm that generates 10 clusters and a k-means clustering algorithm that generates 15 clusters.

The system selects one of the sets of clusters according to the cluster measurements (706). The system selects the set of clusters having a cluster measurement that indicates the best set of clusters, e.g., the set of clusters with the highest cluster measurement.

Once the system selects a set of clusters, the system can use the clusters in one or more geography-based experiments, for example, as described above with reference to FIG. 1.

§4.0 Using the Clustering Measurement to Generate Clusters

In some implementations, after the system selects a set of clusters, for example, as described above in §3.0, the system determines whether the clusters can be improved by moving one or more entities between clusters. For example, the system can select each geographic entity in turn, move the geographic entity from one cluster to another and re-calculate the cluster measurement using the modified clusters. If the cluster measurement improves, the system can assign the geographic entity to its new cluster. If the cluster measurement does not improve, the system can move the geographic entity back to its original cluster. This process can be repeated until a termination criteria is met. Example termination criteria include, for example, that all of the geographic entities have been considered once, that none of the geographic entities were reassigned the last time each geographic entity was considered, or that a predefined iteration limit has been met.

Figure 8:
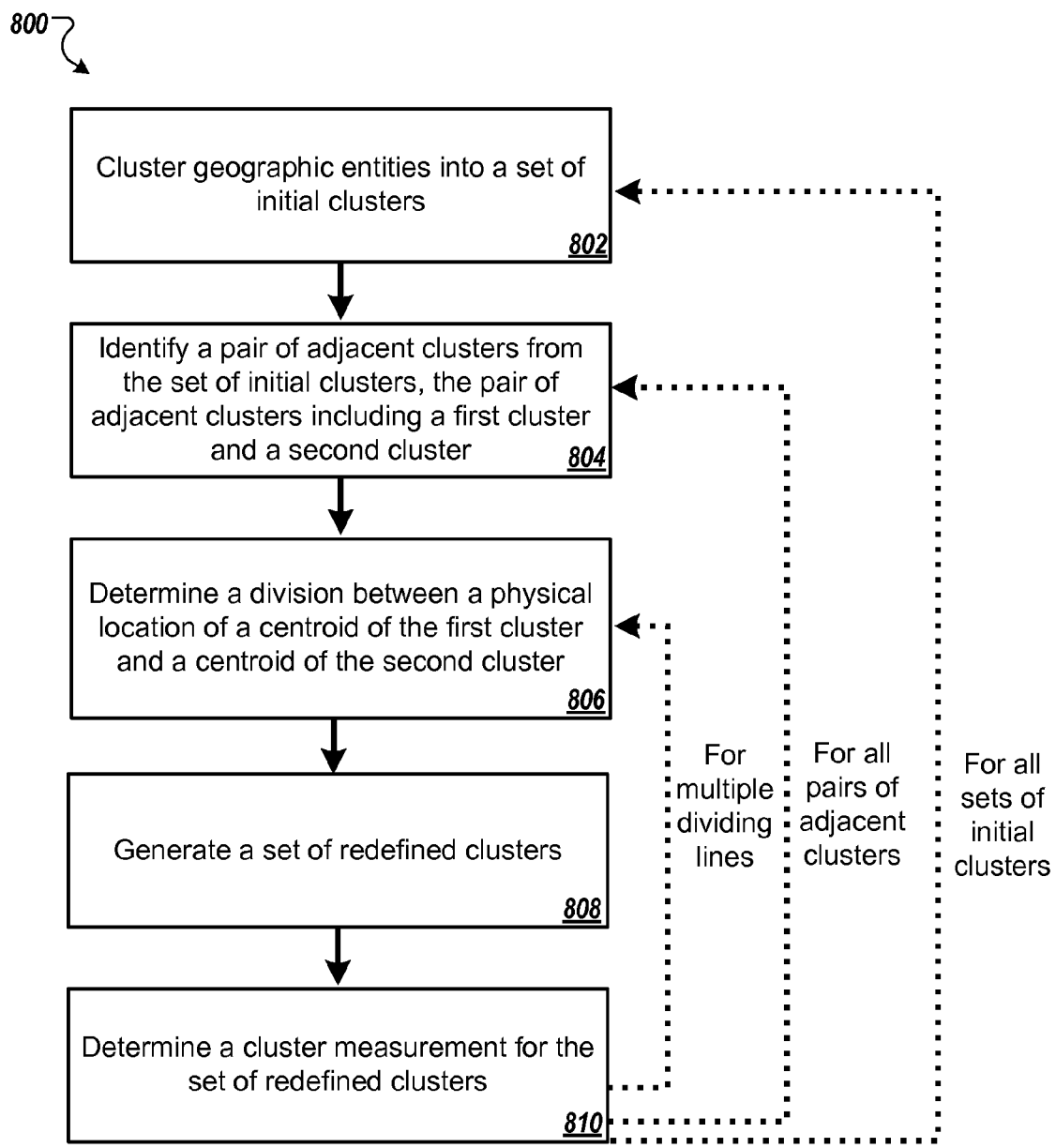
FIG. 8 is a flow diagram of a process for using the clustering measurement for a set of clusters to determine when to move geographic entities between clusters.

FIG. 8 is a flow diagram of a process 800 for using the clustering measurement for a set of clusters to determine when to move geographic entities between clusters. The process 800 can be implemented, for example, by the system 100, described above with reference to FIG. 1.

The process 800 clusters geographic entities into a set of initial clusters (802), for example, using one of the clustering techniques described above. Each geographic entity has an associated physical location, as described above, and the centroid of each cluster also has an associated physical location.

In some implementations, the centroid of a cluster is derived from both a quantification of an attribute of the geographic entities and the physical location of the geographic entities in the cluster. For example, the centroid of a cluster can be calculated according to the following formula:

$$\text{centroid} = \left( \frac{\sum_i w_i x_i}{n}, \frac{\sum_i w_i y_i}{n} \right),$$

where i is a geographic entity in the cluster, $w_i$ is a weight derived from an attribute of the geographic entity i, $x_i$ is the x coordinate of the physical location of the geographic entity i, $y_i$ is the y coordinate of the physical location of the geographic entity i, and n is the total number of entities in the cluster. Example attributes include population.

Other formulas for deriving the centroid of a cluster can also be used.

The process 800 identifies a pair of adjacent clusters from the set of initial clusters (804). The pair of adjacent clusters includes a first cluster and a second cluster. The first cluster and the second cluster are adjacent if at least one geographic entity in the first cluster has a physical location that is closer to a physical location of an entity in the second cluster than to a physical location of any entity in any cluster other than the first and second cluster. In some implementations, the distance between the at least one geographic entity in the first cluster and the geographic entity in the second cluster must be less than a threshold distance for the two clusters to be considered adjacent. The threshold can be, for example, selected so that the probability that a subject who is actually in the geographic entity in the first cluster will be identified as being in the second cluster will be less than an acceptable threshold value, as described above.

The process 800 determines a division between the physical location of the centroid of the first cluster and the physical location of the centroid of the second cluster (806). In some implementations, the division is a line segment, and the process 800 identifies the division by determining a line segment between the centroid of the first cluster and the second cluster, and then identifying a line that is perpendicular to the line between the centroids and that is a pre-determined distance d from the first centroid. In other implementations, other divisions, including curves, planes, and other divisions are alternatively used. For example, if the location of the entities is represented in three-dimensional space, a two-dimensional line or a three-dimensional plane can be used to divide the three-dimensional space. In some implementations, the division corresponds to a region, rather than a single line or plane.

The process 800 generates a set of redefined clusters (808). The process generates a set of redefined clusters by reassigning geographic entities in the first cluster to the second cluster when the geographic entities are separated from the centroid of the first cluster by the division. In some implementations, the process also reassigns geographic entities in the second cluster to the first cluster when the geographic entities are separated from the centroid of the second cluster by the division.

The process 800 determines a cluster measurement for the set of redefined clusters (810), for example, as described above.

Figure 9:
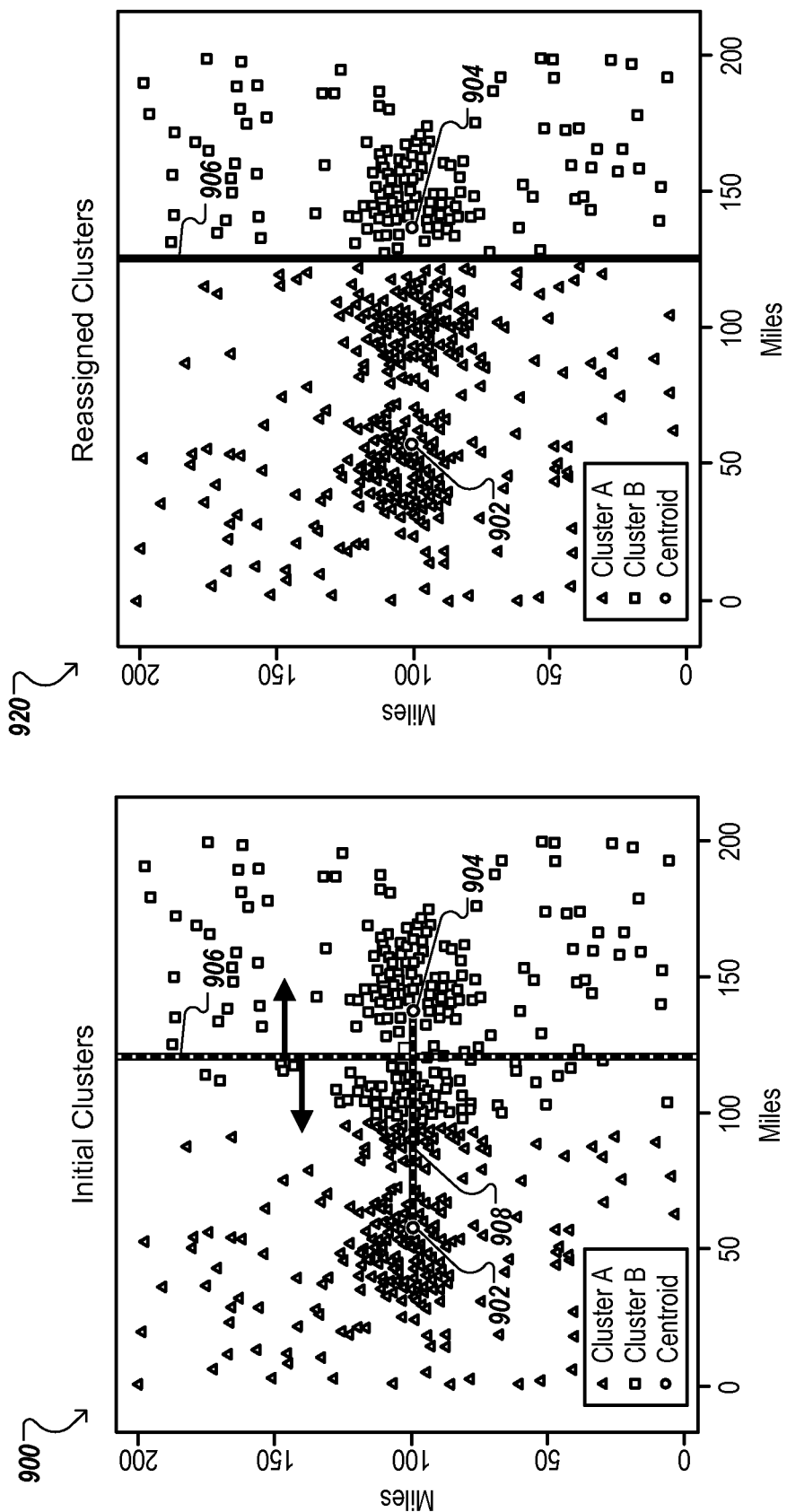
FIG. 9 illustrates an example of generating a set of redefined clusters.

FIG. 9 illustrates an example of generating a set of redefined clusters for an optimal division. Plot 900 illustrates the physical locations of geographic entities clustered into an initial set of clusters. Cluster A (having entities represented by triangles) has a centroid at location 902 and cluster B (having entities represented by squares) has a centroid at location 904. The process identifies a division 906 from a line 910 between the centroids 902 and 904, for example, as described above with reference to FIG. 8. For illustrative purposes, the division 906 is an optimal division. However, multiple divisions can be tested, as described above with reference to FIG. 8.

Plot 920 illustrates the geographic entities after they have been reassigned. The geographic entities in cluster A and cluster B on the left side 922 of the division 906 are now all assigned to cluster A, and the geographic entities in cluster A and cluster B on the right side 924 of the division 906 are now all assigned to cluster B.

Returning to FIG. 8, the process 800 determines a cluster measurement for the set of redefined clusters, for example, as described above in §3.0.

In some implementations, the process 800 repeats steps 806, 808, and 810 for multiple divisions, e.g., for multiple values of d. The process 800 can then select one of the sets of redefined clusters according to the cluster measurements, and update the initial set of clusters to reflect the selected set of redefined clusters. For example, the process can select the set of redefined clusters having the highest cluster measurement. As another example, the process 800 can start by selecting a division that is physically between the two centroids and only select a different division if the different division increases the cluster measurement for the two clusters by more than a threshold amount, e.g., by more than five percent.

In some implementations, the process 800 repeats steps 804, 806, 808, and 810 for each pair of adjacent clusters. The process can recalculate the centroids of the clusters after each iteration. In some implementations, after the process has repeated the steps for all pairs of adjacent clusters, the process starts over using the final set of redefined clusters as the initial set of clusters. In some implementations, the process can also generate a new set of initial clusters and iterate using the new set of initial clusters. For example, the process can repeat steps 802-810 for each of a pre-determined set of initial clusters, or pre-determined set of initial clustering techniques.

Figure 10:
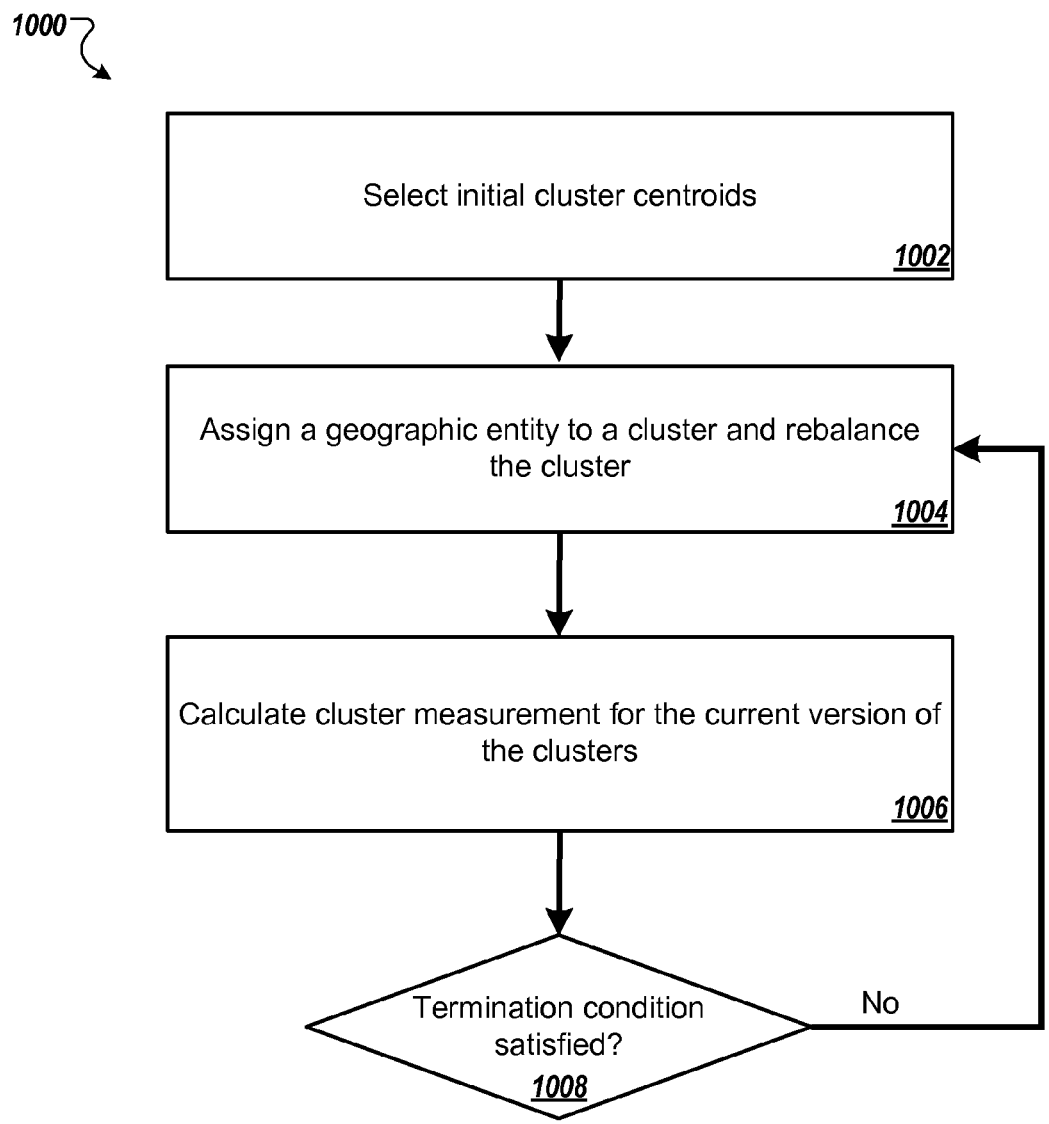
FIG. 10 is a flow diagram of an example process for incrementally adding geographic entities to clusters to evaluate a tradeoff between entity coverage and clustering accuracy.

§5.0 Evaluating Whether Entities should be Omitted from Experimental Analysis FIG. 10 is a flow diagram of an example process 1000 for incrementally adding geographic entities to clusters and evaluating the tradeoff between entity coverage and clustering accuracy. The clustering algorithm used by process 1000 is another example clustering algorithm. The process 1000 can be implemented, for example, by the system 100, described above with reference to FIG. 1.

The process 1000 selects initial cluster centroids (1002). Each centroid corresponds to an initial cluster center. The process 1000 can use various algorithms to select the initial cluster centroids. For example, the process 1000 can cluster the geographic entities according to another clustering algorithm, and then select the center of the physical area covered by each resulting cluster as an initial cluster centroid. As another example, the process 1000 can select the cluster centroids at random. As yet another example, the process can use a k-means++ algorithm to select initial cluster centroids.

The process 1000 then repeats the following steps until a termination condition is met. In some implementations, the process 1000 repeats the following steps for multiple sets of initial cluster centroids.

First, the process 1000 assigns a geographic entity to a cluster and rebalances the cluster (1004). Then, the process calculates a cluster measurement for the current version of the clusters (1006), for example, using one of the methods described above with reference to FIGS. 5 and 6.

The process 1000 can assign a geographic entity to a cluster using various methods. In some implementations, the process 1000 iterates through the clusters according to an order. The process 1000 selects a closest geographic entity to the centroid of the current cluster, according to a distance metric, and assigns the selected geographic entity to the cluster. Various distance metrics, for example, the distance metrics described above with reference to FIG. 2, can be used. In other implementations, the process 1000 identifies a cluster according to a quantification of an attribute of the geographic entities associated with the cluster. Examine quantifications of attributes are described above with reference to FIG. 5. For example, the process 1000 can identify the cluster whose quantification of the attribute is the lowest of all of the clusters. The process 1000 then selects a closest geographic entity to the centroid of the identified cluster according to a distance metric, and assigns the selected geographic entity to the identified cluster. In still other implementations, the process 1000 associates each geographic entity with a pre-determined cluster for the entity. Then, in each iteration, the process 1000 assigns the geographic entity that is closest to the centroid of its pre-determined cluster to its pre-determined cluster. The pre-determined clusters can be determined, for example, using any of the clustering algorithms described above.

The process 1000 rebalances the cluster to which the entity is added by re-calculating the centroid of the cluster.

In some implementations, the process 1000 also rebalances the other clusters, for example, by determining whether each entity in the other clusters is now closer to the centroid of the cluster to which the entity was added than to the centroid of their own cluster, and moving any entities that are closer to the centroid of the cluster to which the entity was added to the cluster to which the entity was added.

If the termination condition is not satisfied (1008), the process 1000 returns to step 1004. In some implementations, the termination condition is satisfied when the cluster measurement calculated in step 1006 is less than a cluster measurement calculated during a previous iteration, or less than a pre-determined threshold. In these implementations, the process 1000 can optionally remove the last-added geographic entity from the cluster after it is determined that the termination condition is met.

In other implementations, the termination condition is satisfied when each geographic entity has been assigned to a cluster. In these implementations, process 1000 optionally stores data after each iteration that identifies the number of assigned geographic entities after the iteration and the cluster measurement determined for the iteration. This data can later be used by system 100 to determine whether some of the geographic entities should be omitted from an experiment, e.g., not considered when evaluating the results of an experiment. Removing some of the geographic entities from the experiment reduces geolocation uncertainty and results in more certain results from the experiment.

In some implementations, the system 100 analyzes the cluster measurements for different numbers of entities to determine an acceptable number of entities. The acceptable number of entities is determined according to experiment-specific metrics of acceptability. For example, for one experiment, the acceptable number of entities can be defined as the largest number of entities for which the cluster measurement satisfies a pre-determined threshold.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    storing, in one or more data processing apparatuses, data identifying a plurality of geographic entities;
    incrementally generating clusters of the plurality of geographic entities using a clustering algorithm, with the one or more data processing apparatuses, by identifying a plurality of clusters, and repeating the following actions until a threshold condition is satisfied with respect to a cluster measurement of the clusters:
        assigning one or more of the plurality of geographic entities to the clusters, wherein a geographic entity is assigned to a cluster that is the closest to the geographic entity according to a distance metric;
        determining a cluster measurement for the clusters from a quantification of an attribute of each geographic entity assigned to a cluster, the attribute comprising an experiment-specific attribute of the one or more geographic entities;
        storing cluster data associating a number of geographic entities assigned to clusters and the determined cluster measurement;
    wherein a different clustering algorithm is used each time to generate the clusters, when the threshold condition is not satisfied; and
    analyzing the determined cluster measurement for each of one or more of the number of geographic entities to select a particular number of geographic entities when the threshold condition is satisfied.

2. A computer-implemented method, comprising:
    clustering, with one or more data processing apparatuses, a plurality of geographic entities into a set of initial clusters, each cluster of the set of initial clusters having a respective centroid having an associated physical location, wherein each geographic entity of the plurality of geographic entities has a respective associated physical location;
    identifying, with the one or more data processing apparatuses, a pair of adjacent clusters from the set of initial clusters, wherein the pair of adjacent clusters comprises a first cluster containing a first subset of geographic entities of the plurality of geographic entities and a second cluster containing a second subset of geographic entities of the plurality of geographic entities, wherein each geographic entity of the first set of geographic entities has an associated physical location that is closer to the associated physical location of at least one geographic entity of the second set of geographic entities than to the associated physical location of any geographic entity in any other cluster of the set of initial clusters;
    determining, with the one or more data processing apparatuses, a division between the associated physical location of the centroid of the first cluster and the associated physical location of the centroid of the second cluster;
    generating, with the one or more data processing apparatuses, a set of redefined clusters, the generating including reassigning one or more of the geographic entities in the first cluster to the second cluster, wherein the associated physical location of each of the one or more redefined geographic entities is separated from the associated physical location of the first centroid by the division; and
    determining, with the one or more data processing apparatuses, a cluster measurement for the set of redefined clusters, wherein the cluster measurement is derived from a quantification of an attribute of each definitively classified entity in the set of redefined clusters and a quantification of the same attribute of each ambiguously classified entity in the set of redefined clusters.

3. The method of claim 2, wherein generating the set of redefined clusters further comprises reassigning one or more of the second geographic entities in the second cluster to the first cluster, wherein the associated physical location of each redefined second geographic entity is separated from the physical location of the second centroid by the division.

4. The method of claim 2, wherein determining the division comprises identifying a line that is perpendicular to a line between the first centroid and the second centroid and that is a pre-determined distance d from the first centroid.

5. The method of claim 4, further comprising:
repeating, for each of multiple pre-determined distances d, the determining the division, generating a set of redefined clusters, and determining a cluster measurement; and
selecting one of the sets of redefined clusters according to the determined cluster measurements.

6. The method of claim 5, further comprising updating the first centroid and the second centroid according to the selected set of redefined clusters.

7. The method of claim 5, further comprising identifying all adjacent clusters in the set of initial clusters and, for each cluster, determining a division between the centroids of the clusters in the pair of clusters, generating another set of redefined clusters, and determining another cluster measurement for the set of redefined clusters.

8. A system, comprising:
a processor; and
a computer storage medium coupled to the processor and including instructions, which, when executed by the processor, cause the processor to perform operations comprising:
storing data identifying a plurality of geographic entities;
incrementally generating clusters of the plurality of geographic entities using a clustering algorithm by identifying a plurality of clusters, and repeating the following actions until a threshold condition is satisfied with respect to a cluster measurement of the clusters:
assigning one or more of the plurality of geographic entities to the clusters, wherein a geographic entity is assigned to a cluster that is the closest to the geographic entity according to a distance metric;
determining a cluster measurement for the clusters from a quantification of an attribute of each geographic entity assigned to a cluster, the attribute comprising an experiment-specific attribute of the one or more geographic entities;
storing cluster data associating a number of geographic entities assigned to clusters and the determined cluster measurement;
wherein a different clustering algorithm is used each time to generate the clusters, when the threshold condition is not satisfied; and
analyzing the determined cluster measurement for each of one or more of the number of geographic entities to select a particular number of geographic entities when the threshold condition is satisfied.

9. A system, comprising:
a processor; and
a computer storage medium coupled to the processor and including instructions, which, when executed by the processor, cause the processor to perform operations comprising:
clustering a plurality of geographic entities into a set of initial clusters, each cluster of the set of initial clusters having a respective centroid having an associated physical location, wherein each geographic entity of the plurality of geographic entities has a respective associated physical location;
identifying a pair of adjacent clusters from the set of initial clusters, wherein the pair of adjacent clusters comprises a first cluster containing a first subset of geographic entities of the plurality of geographic entities and a second cluster containing a second subset of geographic entities of the plurality of geographic entities, wherein each geographic entity of the first set of geographic entities has an associated physical location that is closer to the associated physical location of at least one geographic entity of the second set of geographic entities than to the associated physical location of any geographic entity in any other cluster of the set of initial clusters;
determining a division between the associated physical location of the centroid of the first cluster and the associated physical location of the centroid of the second cluster;
generating a set of redefined clusters, the generating including reassigning one or more of the geographic entities in the first cluster to the second cluster, wherein the associated physical location of each of the one or more redefined geographic entities is separated from the associated physical location of the first centroid by the division; and
determining a cluster measurement for the set of redefined clusters, wherein the cluster measurement is derived from a quantification of an attribute of each definitively classified entity in the set of redefined clusters and a quantification of the same attribute of each ambiguously classified entity in the set of redefined clusters.

10. The system of claim 9, wherein generating the set of redefined clusters further comprises reassigning one or more of the second geographic entities in the second cluster to the first cluster, wherein the associated physical location of each reassigned second geographic entity is separated from the physical location of the second centroid by the division.

11. The system of claim 9, wherein determining the division comprises identifying a line that is perpendicular to a line between the first centroid and the second centroid and that is a pre-determined distance d from the first centroid.

12. The system of claim 11, further operable to perform operations comprising:
repeating, for each of multiple pre-determined distances d, the determining the
division, generating a set of redefined clusters, and determining a cluster measurement; and
selecting one of the sets of redefined clusters according to the determined cluster measurements.

13. The system of claim 12, further operable to perform operations comprising updating the first centroid and the second centroid according to the selected set of redefined clusters.

14. The system of claim 12, further operable to perform operations comprising identifying all adjacent clusters in the set of initial clusters and, for each cluster, determining a division between the centroids of the clusters in the pair of clusters, generating another set of redefined clusters, and determining another cluster measurement for the set of redefined clusters.

* * * * *